(12) United States Patent
Roy et al.

(10) Patent No.: US 10,838,780 B2
(45) Date of Patent: Nov. 17, 2020

(54) PORTABLE HOSTED CONTENT

(71) Applicant: McAfee, LLC, San Jose, CA (US)

(72) Inventors: Chris M. Roy, Waterloo (CA);
Shuborno Biswas, Waterloo (CA)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 16/214,438

(22) Filed: Dec. 10, 2018

(65) Prior Publication Data

US 2020/0183761 A1 Jun. 11, 2020

(51) Int. Cl.
*G06F 9/54* (2006.01)
*G06F 16/958* (2019.01)
*H04L 29/06* (2006.01)
*G06F 9/50* (2006.01)

(52) U.S. Cl.
CPC ............ *G06F 9/541* (2013.01); *G06F 9/5077* (2013.01); *G06F 9/547* (2013.01); *G06F 16/972* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,314,445 B1 * | 11/2001 | Poole | |
| 6,460,050 B1 | 10/2002 | Pace et al. | |
| 7,506,155 B1 | 3/2009 | Stewart et al. | |
| 9,239,812 B1 | 1/2016 | Berlin | |
| 2004/0226027 A1 * | 11/2004 | Winter | |
| 2014/0082502 A1 * | 3/2014 | Rubel | |
| 2014/0136945 A1 * | 5/2014 | Ligman | |
| 2015/0020084 A1 | 1/2015 | Pierson et al. | |
| 2017/0147479 A1 | 5/2017 | Boyter et al. | |
| 2018/0024872 A1 | 1/2018 | Meijer et al. | |
| 2018/0089005 A1 | 3/2018 | Green | |

OTHER PUBLICATIONS

PCT International Search Report and Written Opinion issued in PCT Application No. PCT/US2019/065194 dated Mar. 30, 2020; 10 pages.

* cited by examiner

*Primary Examiner* — Syed A Roni
(74) *Attorney, Agent, or Firm* — Patent Capital Group

(57) ABSTRACT

There is disclosed, in one example, a computing apparatus for providing a portable user interface agnostic to a native host implementation, including: a hardware platform including a processor and a memory; a first functional domain including logic to provide the user interface; a second functional domain including logic to provide native functionality; a function storage including logic to assign a unique identifier to a function of the second functional domain; and an application programming interface (API) interpreter to enable the first functional domain to access the function of the second functional domain via the unique identifier for the function.

20 Claims, 9 Drawing Sheets

PORTABLE HOSTED CONTENT

FIELD OF THE SPECIFICATION

This disclosure relates in general to the field of computer security, and more particularly, though not exclusively, to a system and method for providing portable hosted content.

BACKGROUND

As computing applications have evolved, a wide variety of programming languages and user interfaces have been developed.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
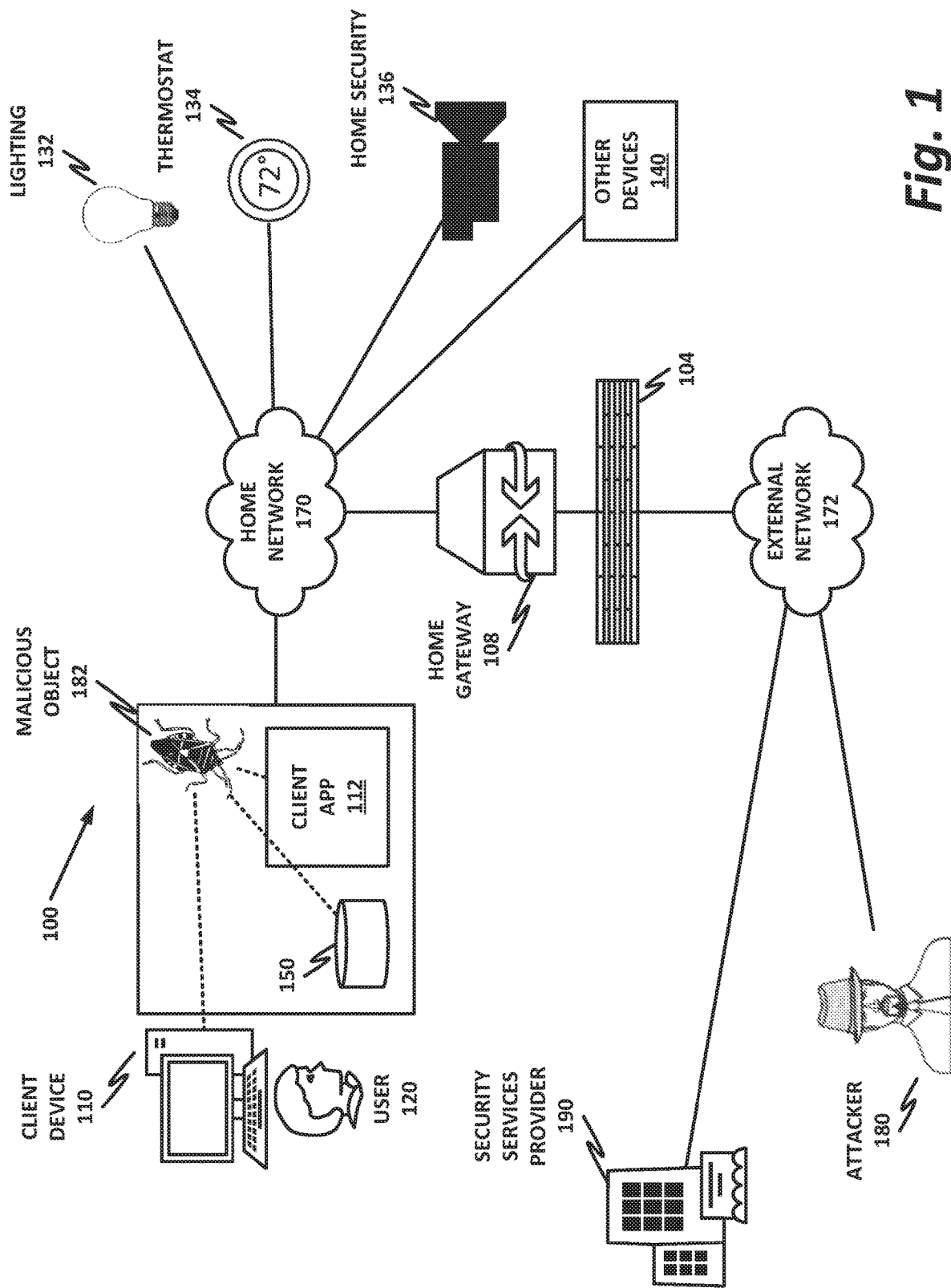
FIG. 1 is a block diagram of a home network.

In one example, there is disclosed a computing apparatus for providing a portable user interface agnostic to a native host implementation, including: a hardware platform including a processor and a memory; a first functional domain including logic to provide the user interface; a second functional domain including logic to provide native functionality; a function storage including logic to assign a unique identifier to a function of the second functional domain; and an application programming interface (API) interpreter to enable the first functional domain to access the function of the second functional domain via the unique identifier for the function.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Portability is an issue that has been a concern to system programmers since the very early days of computing. In the 1960s and 1970s, programmers recognized that although the various computing systems had their own instruction sets and their own mechanisms for carrying out computing operations, those operations were, at an abstract level, often very similar. This led to the creation of high-level languages such as C and Fortran that included directives that could be compiled for a plurality of platforms. This also led to the creation of standards such as the Portable Operating System Interface (POSIX) family of standards that specified requirements for an operating system that could compile and run high-level code.

As computers evolved, additional levels of abstraction were added. For example, in modern computing, a user interface (UI) is often implemented in a browser using HTML and JavaScript. This browser-based UI may include calls to an application programming interface (API) that interfaces with a lower-level programming language such as C, C++, C#, or similar. Functions implemented in the lower-level language then carry out platform specific operations as directed by the browser-based UI.

In the present specification, an antivirus or anti-malware security program is used as an illustrative embodiment of a system that may employ various levels of abstraction. Although this example is used throughout the present specification, it should be understood as a nonlimiting, illustrative example only. The teachings of the present specification are generally applicable to computer programming techniques, and may be readily adapted to other applications.

By way of example, security software (such as software provided by MCAFEE, LLC) can illustrate the evolution of a modern computing system. For example, consumer security software has recently experienced a shift in its model. Previously, security software ran as a Windows or other operating system desktop application, with a user interface and underlying code that were generally implemented in the same or a similar high-level platform computing language. This would have been a language such as C, C++, C#, Microsoft.net, or some combination thereof.

In newer implementations, security software may be a hybrid of a web interface including a website and/or browser extensions, a universal Windows platform (UWP)/Windows 10 S native application, and Windows desktop software. In this example, the UWP code is provided as closed operating system (OS) native software, while the Windows desktop software may be open OS native software. As used in the present specification, a closed OS is one that controls application distribution (e.g., by way of a web-based commercial storefront), and that controls application access to OS capabilities. An open OS is one that provides unrestricted application access to OS capabilities. It should be noted that the aforementioned implementation is an illustrative example only, and that other implementations are possible within the scope of the present specification.

One reason for this shift in implementation is the goal of creating a more consistent user experience. It is desirable for the user experience to be agnostic of an application's native capabilities. Thus, it is preferable that the user experience is provided with portable user interface code. Web-based UI technology, such as HTML, JavaScript, and/or Cascading Style Sheets (CSS), provides an industry standard for a portable UI, which can be hosted as an application on most platforms able to render such code.

In these cases, the UI and the native implementation may be said to exist in separate "functional domains." These functional domains may be separated by language, feature set, semantics, hardware, or other attributes that make it difficult for separate functional domains to interoperate natively with one another. For example, the UI may reside in a first functional domain that uses web technologies, such as HTML, JavaScript, XML, and similar to create a user interface. The native platform functionality may exist in a second functional domain implemented in C, C++, C#, UWP, or similar. These functional domains cannot generally interact directly with one another, or access one another's functions directly. Rather, interactions may be handled via an API or the raising of certain signals or interrupts, or other mechanisms. In some cases, functional domains may also reside on completely separate hardware. For example, a UI on one functional domain could be used to manage a database running on a functional domain on a backend or middleware server.

Although the UI code of the first functional domain in the previous example is based on open, published standards, it is often not reusable across application platforms. Rather, because the underlying native code (residing in a second functional domain) is very different from platform to platform, and because the UI code is closely coupled to the native platform code, it may be necessary to completely re-factor the UI code for each underlying native application. However, implementations of the present specification provide the ability to reuse the same UI code across a number of application platforms.

More generally, this specification provides a performance optimal and code optimal solution to enable web content to be portable by allowing native calls, but leaving the native host interchangeable across any host application's native technology.

Table 1 below provides illustrative use cases, by way of nonlimiting example.

TABLE 1

Use Cases

| Host Application Native Implementation | Example Use Case |
|---|---|
| C++ Windows native code | Endpoint security application with full system access |
| C# UWP application code | UWP application with limited security capabilities |
| Web content hosted in an iFrame (web host) | Web site with no native messaging |

The present specification provides web content that is agnostic to the host implementation, and therefore portable across host implementations. Many existing solutions are not interchangeable between hosts because the web content is tied directly to the host implementation. For example, a WinRT component is used for UWP apps, while native messaging is used for browser extensions. The present specification provides a function storage and API interpreter. The combination of the function storage and API interpreter provides web content that is agnostic of the host implementation, and that is highly performant even in the presence of frequent native calls.

According to the teachings of the present specification, web content may be agnostic to the host implementation by the introduction of the combination of a function storage and API wrapper component for web content. An API interpreter component is provided for the host. Advantageously, the developer of the web content (for example, a user interface) may code their native calls to the host against the API wrapper. The API wrapper abstracts and secures the web-to-host communication technology, and the use of the function storage per call. The API interpreter code of the host translates the web-to-host communication technology to the native, application-specific APIs available to the host.

The API wrapper and API interpreter ensure that the web content is portable. A new supported host may require implementation of a new API wrapper and new API interpreter, but no changes need to be made to the web content providing the UI. This is because the web content need not be coded against the host's capabilities. This helps to ensure that the web content or other UI content is portable.

A system and method for providing portable hosted content will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a home network 100. Embodiments of home network 100 may be adapted to provide portable hosted content, consistent with the teachings of the present specification.

In the example of FIG. 1, home network 100 may be a "smart home" with various Internet of things (IoT) devices that provide home automation or other services. Home network 100 is provided herein as an illustrative and non-limiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 100, one or more users 120 operate one or more client devices 110. A single user 120 and single client device 110 are illustrated here for simplicity, but a home or enterprise may have multiple users, each of which may have multiple devices.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions running on client devices 110.

In this illustration, home network 170 is shown as a single network for simplicity, but in some embodiments, home network 170 may include any number of networks, such as one or more intranets connected to the Internet. Home network 170 may also provide access to an external network, such as the Internet, via external network 172. External network 172 may similarly be any suitable type of network.

Home network 170 may connect to the Internet via a home gateway 108, which may be responsible, among other things, for providing a logical boundary between home network 172 and external network 170. Home network 170 may also provide services such as dynamic host configuration protocol (DHCP), gateway services, router services, and switching services, and may act as a security portal across home boundary 104.

Home network 100 may also include a number of discrete IoT devices, which in contemporary practice are increasing regularly. For example, home network 100 may include IoT functionality to control lighting 132, thermostats or other environmental controls 134, a home security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Home network 100 may communicate across home boundary 104 with external network 172. Home boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 100, such as security software, security updates, network appliances, or similar. For example, MCAFEE, LLC provides a comprehensive suite of security services that may be used to protect home network 100.

It may be a goal of users 120 and home network 100 to successfully operate client devices 110 and IoT devices without interference from attacker 180 or from unwanted security objects. In one example, attacker 180 is a malware author whose goal or purpose is to cause malicious harm or mischief, for example, by injecting malicious object 182 into client device 110. According to embodiments of the present specification, malicious object 182 may include a fileless attack or a living off the land attack. Fileless attacks or living off the land attacks may be considered security threats or attacks, by way of nonlimiting example. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to home resources. Client application 112 could include a website and browser extension to provide a UI. It could also include, for example, a closed OS native UWP or Windows 10 S application, or a Windows desktop application to provide lower-level functions to carry out the instructions of the UI.

Attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any security object designed or configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 100 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the Global Threat Intelligence (GTI™) database provided by MCAFEE, LLC. Security services provider 190 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 2:
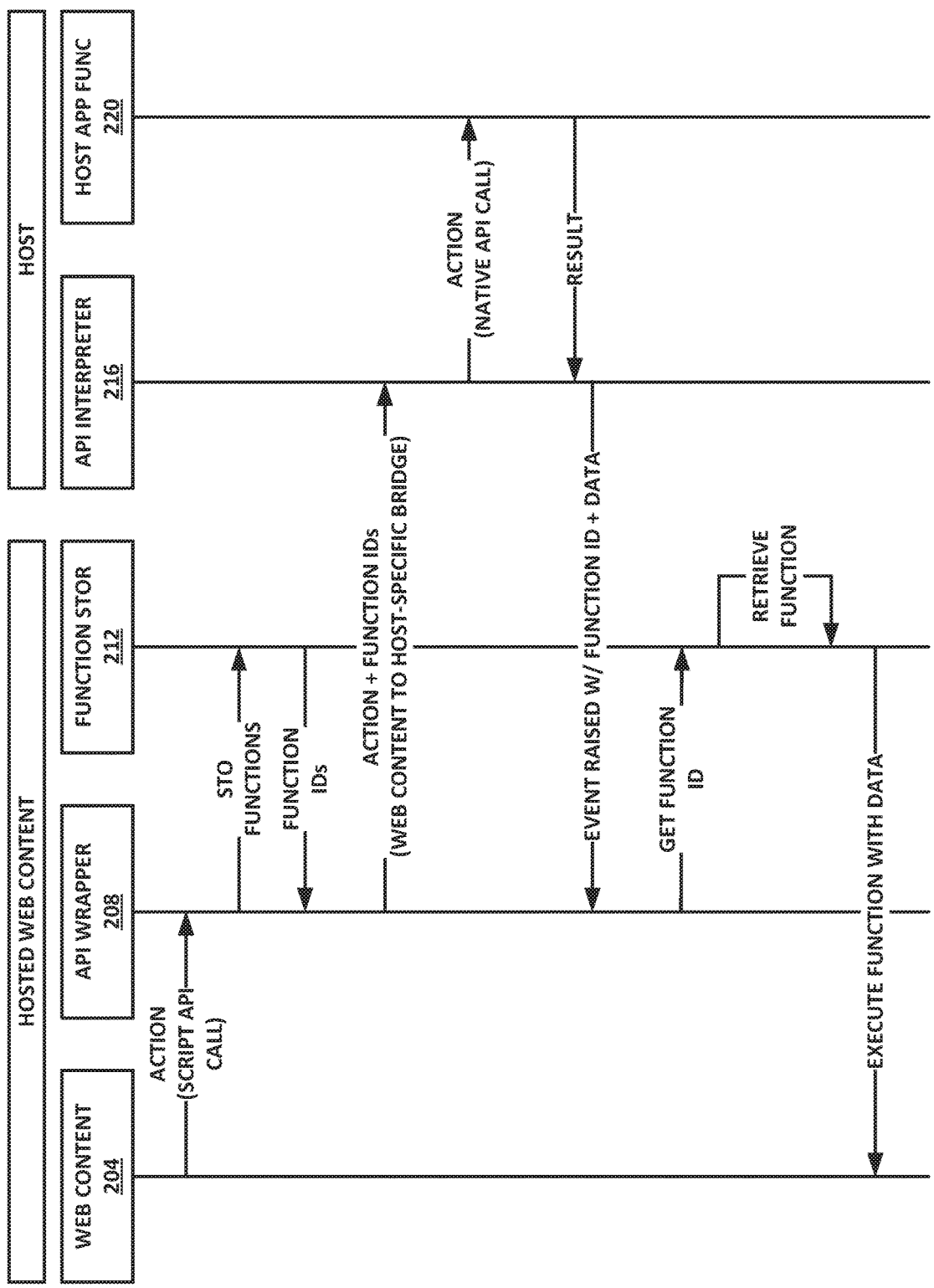
FIG. 2 is a signal flow diagram illustrating communication in a portable hosted content system.

FIG. 2 is a signal flow diagram illustrating communication in a portable hosted content system. In the example of FIG. 2, hosted web content provides a user interface, for example, while the host provides the actual implementation of the antivirus functions provided here.

In an example signal flow, web content 204 requests a particular action. This action may be provided as a scripted API call to API wrapper 208. API wrapper 208 then sends a signal to store the function to function storage 212. Function storage 212 allows functions to be stored with a unique identifier and with additional metadata such as associated event names. This allows the system to provide an identity to the anonymous function in a transparent manner. This is particularly useful in systems such as JavaScript that use anonymous functions. A developer using this bridging technique need not be aware that functions are stored or processed in this way. The identity value can be passed across languages using the built-in, host-specific implementation of messaging between the web and native code, without incurring the cost of function marshalling.

Thus, when a function is stored in function storage 212, function storage 212 provides the function ID (including, for example, the unique identifier and other metadata) back to API wrapper 208.

API wrapper 208 may then use the action plus the function ID to provide a call to API interpreter 216. The action-plus-function ID can include web content-to-host-specific bridge, by way of nonlimiting example.

API interpreter 216 then executes the action by providing a native API call to host application functions 220.

Host application functions 220 carry out the action and optionally may provide a result to API interpreter 216. API interpreter 216 may then provide back to API wrapper 208 the event raised with the function ID and the data. API wrapper 208 may get the function ID from function storage 212, and function storage 212 then retrieves the appropriate function. Function storage 212 then causes web content 204 to execute the function with the appropriate data.

This allows the web content 204 to execute a low-level native function in host application functions 220, while also allowing host application functions 220 to raise an event that causes a function to be executed within web content 204.

This offers improvements over some existing solutions. For example, web browsers like Chrome and Edge offer a concept of "native messaging," in which a browser extension can communicate with a paired native application on the device, outside the bounds of the browser. The browser provides means for the native application to expose APIs to the extension, and the extension processes web content that may make calls into those APIs. Note that the method disclosed in the signal flow diagram of FIG. 2 does not replace native messaging. Rather, native messaging may be leveraged internal to API wrapper 208, as part of its abstraction layer. In this method, the design of the API used by web content 204 may be agnostic to the specific host. For example, web content 204 need not know that it is running on the Chrome browser. This is in contrast to some existing solutions where web content is defined by the host. In this context, the host application may be considered as a combination of the browser extension and the native application it is paired to. For example, a Microsoft Edge extension may follow this pattern, where both the extension and the native app are delivered in the same UWP app package.

Windows applications can also host web content through a variety of technologies, such as Internet Explorer browser control, a Chromium implementation, or in more modern technologies, an extensible application markup language (XAML) island using an XAML web control (for example, using the Microsoft Edge browser's rendering technology).

These implementations expose a number of means to provide native calls to the hosted web content. The method disclosed here builds upon these mechanisms in a manner similar to the way described above for the browser. Web content 204 interacts with an API wrapper 208 designed to be agnostic to the host that it is implemented on. Each host has its own messaging mechanism between web content 204 and native implementations in host application functions 220. API wrapper 208 and API interpreter 216 together abstract the messaging and host API call, respectively.

This provides, for example, portability advantages. The portability is illustrated by the fact that the teachings of the present specification can be used with web content hosted in an inline frame (iFrame). This is a case where the host application is also web content. This means that the same web content can be hosted on a website, as long as the website can facilitate a functional implementation of the API interpreter. In the case of iFrames, web technology offers the postMessage( ) as a communication channel between web content and the iFrame host.

Security advantages are also realized by the present specification. Because there is an API wrapper in the flow, there is an abstraction with host-specific code ahead of the web-to-native messaging to the host. Web content offers certain metadata such as the domain the content is hosted in, and the metadata may be used as necessary to prevent the call to the host application from happening to begin with. For example, an implementation may add a white list of actions or API calls, based on a given web content host domain. Any calls made by web content hosted outside of that trusted domain may be blocked. In contrast with existing solutions, Edge extensions offer this security feature, but it is offered based on the capability of the native UWP host application package. The security feature is not portable to any other type of host such as Google Chrome. The teachings of the present specification isolate this security in the same part of the flow, namely with an API wrapper 208. Thus, the implementation of secure web content 204 need not be dependent, for example, on implementation within a specific host such as Microsoft Edge.

The teachings of the present specification also grant functional advantages. For example, the teachings provide the ability to assign an identity to an anonymous function. Anonymous functions are frequently used as callbacks. For example, an XAML WebView for UWP apps or XAML islands has a method called "InvokeScriptAsync" that only works on named functions. But using the teachings of the present specification, a Chromium window could handle anonymous functions with a method call such as InvokeScriptAsync. The present specification enables this functionality across multiple platforms and hosts, such as across XAML or Chromium.

Advantageously for the consumer, the present specification allows a web UI to be displayed as a webpage in a UWP app, in a Chromium window for the Windows desktop app, or in a browser extension, all using the same UI layer implementation across all of those hosts.

Figure 3:
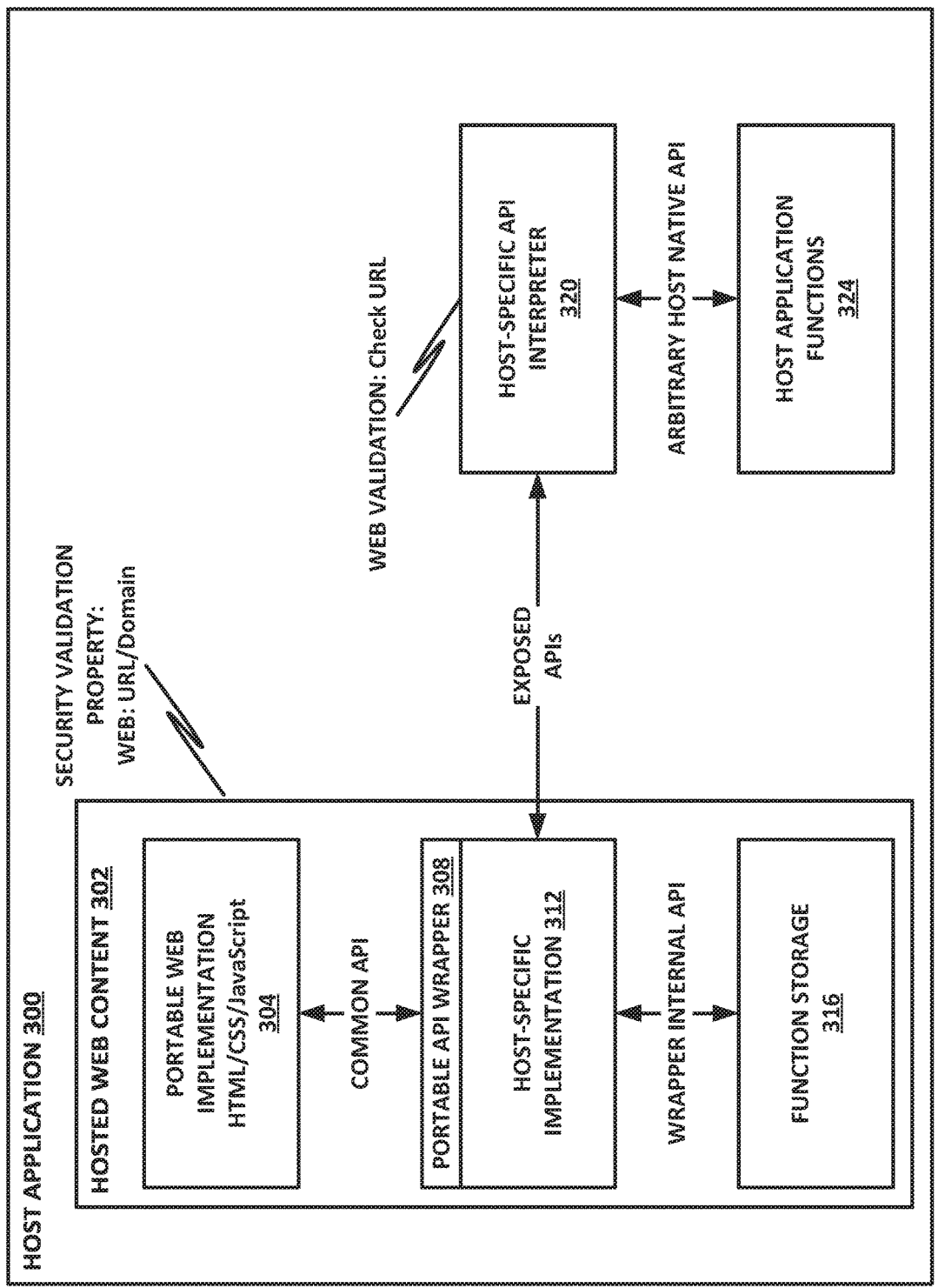
FIG. 3 is a block diagram of selected elements of a host application.

FIG. 3 is a block diagram of selected elements of a host application 300, which may be an example of client application 112 of FIG. 1. Host application 300 introduces several components that provide bridging between the web content and the host application's functionality.

Specifically, host application 300 includes hosted web content 302 and a host-specific API interpreter 320. Hosted web content 302 includes a portable web implementation 304, which may include, for example, HTML, CSS, JavaScript, or other common web technologies. Hosted web content 302 also includes a portable API wrapper 308. Portable API wrapper 308 may include a host-specific API implementation 312, and may communicate with portable web implementation 304 via well-defined common APIs. Portable API wrapper 308 may also communicate with host-specific API interpreter 320 via APIs exposed by host-specific API interpreter 320. For example, host-specific API interpreter 320 may expose native APIs to JavaScript using implementation-specific technology. Portable API wrapper 308 may communicate with host-specific API interpreter 320 via host-specific native messaging.

Returning to hosted web content 302, portable API wrapper 308 includes host-specific implementation 312 which communicates with function storage 316 via wrap or internal APIs.

Host-specific API interpreter 320 may include the host's native implementation of the technology. Host-specific API interpreter 320 may communicate with host application functions 324 via, for example, arbitrary host-native APIs. Host application functions 324 may include the host's native implementation technology.

Figure 4:
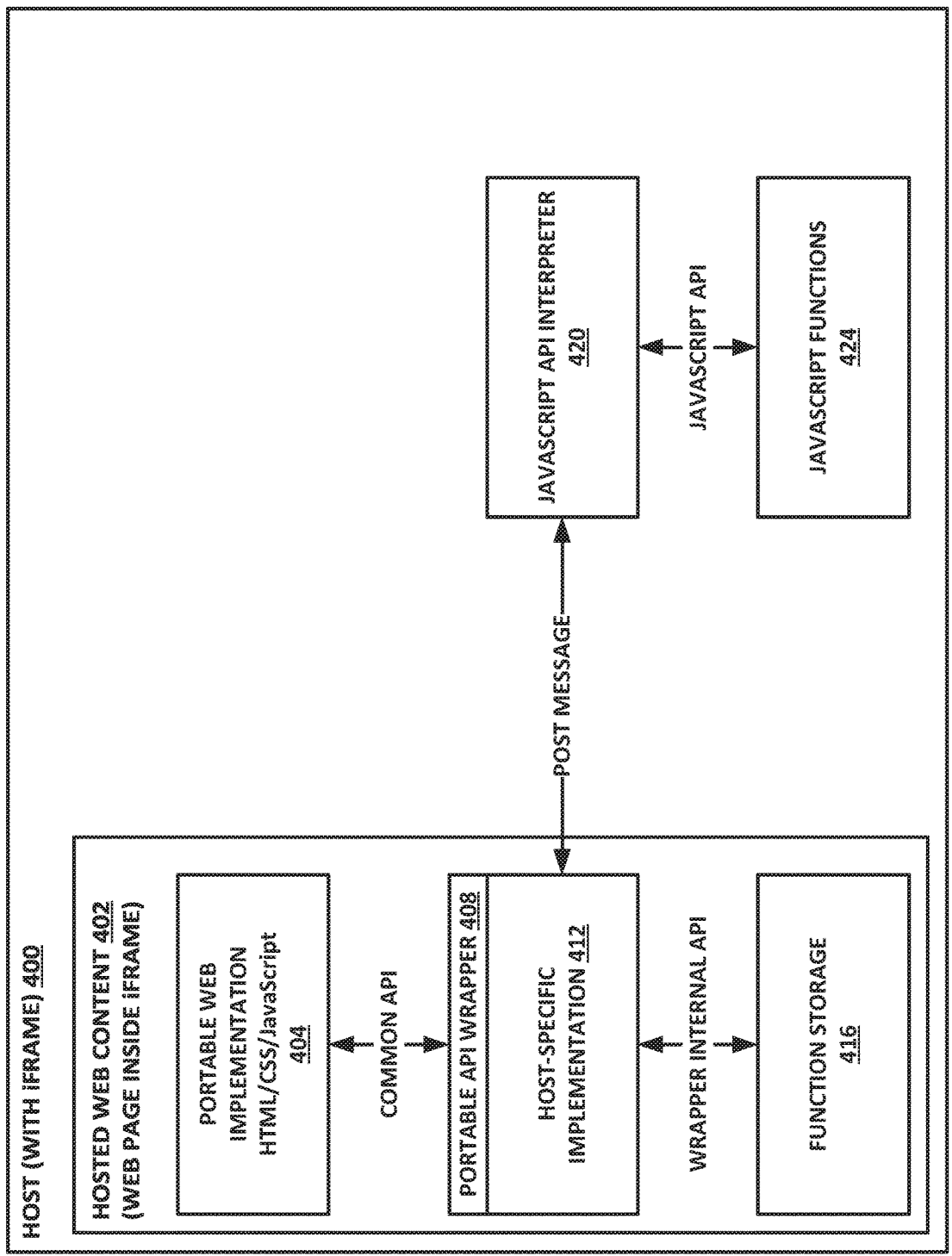
FIG. 4 is a block diagram of a host application with an inline frame (iFrame).
Figure 5:
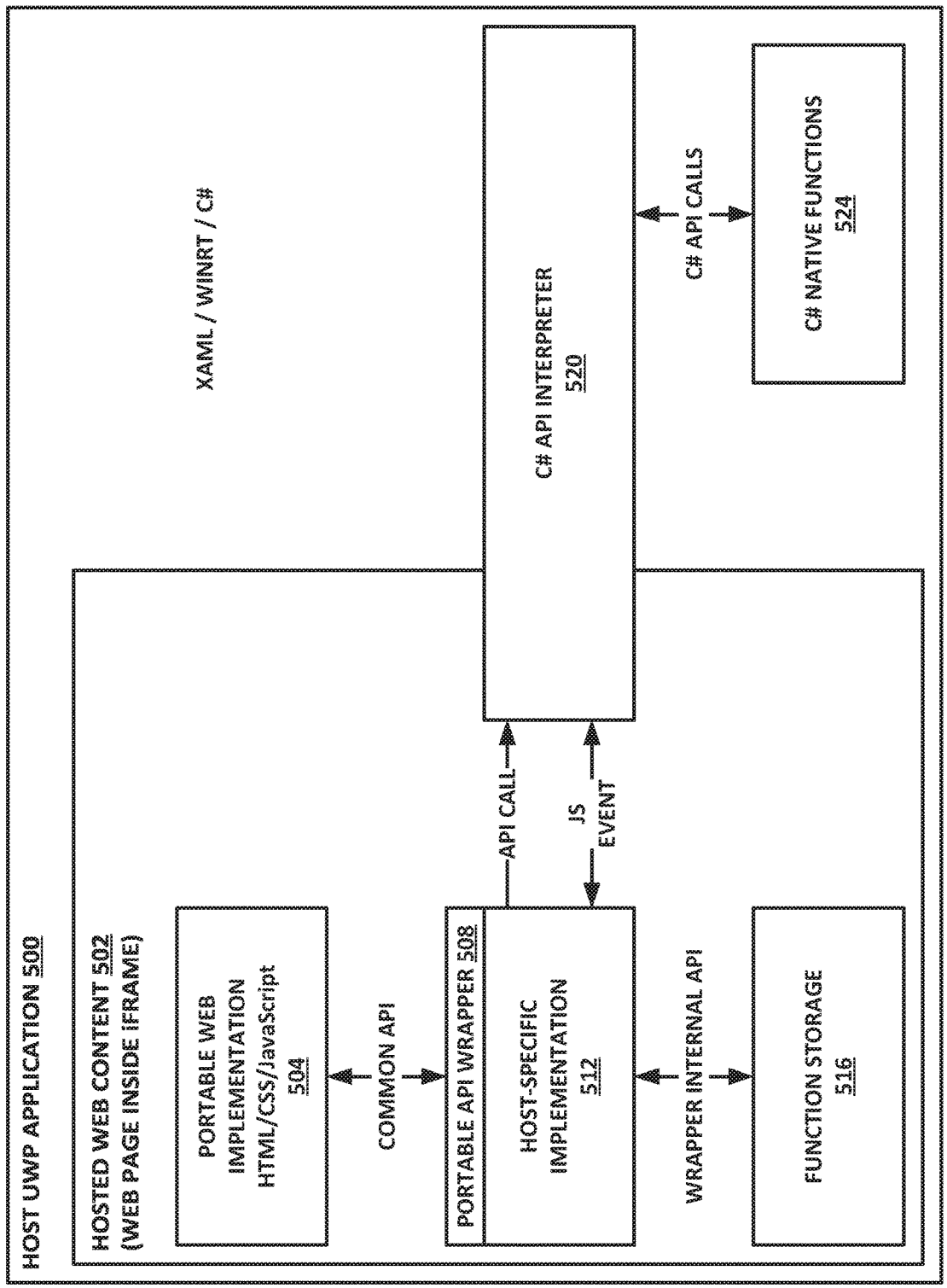
FIG. 5 is a block diagram of a host universal Windows platform (UWP) application.

In this FIGURE, hosted web content 302 represents the implementation of a web-based stack. The content can be stored locally or remotely. In some examples, it may be hosted in an iFrame, as illustrated in FIG. 4, or via a native web control supported by the host application. This could be, for example, Chromium or Edge control in XAML, as illustrated in FIG. 5.

Portable API wrapper 308 directly interfaces with portable web implementation 304. While the API surface remains consistent, the internal API implementation may change depending on which host the wrapper bridges to.

FIG. 4 is a block diagram of a host application 400 with an iFrame, which may be an example of client application 112 of FIG. 1. Web content hosted in an iFrame may leverage a different communication channel than web content hosted without an iFrame. For example, host application 400 with an iFrame may use a postMessage( ) to communicate.

Specifically, host application 400 includes hosted web content 402 and a JavaScript API interpreter 420. Hosted web content 402 includes a portable web implementation 404, which may include, for example, HTML, CSS, JavaScript, or other common web technologies. Hosted web content 402 also includes a portable API wrapper 408. Portable API wrapper 408 may include a host-specific API implementation 412, and may communicate with portable web implementation 404 via well-defined common APIs. Host-specific implementation 412 may communicate with JavaScript API interpreter 420 via postMessage( ). Portable API wrapper 408 may also communicate with JavaScript API interpreter 420 via host-specific native messaging.

Returning to hosted web content 402, portable API wrapper 408 includes host-specific implementation 412 which communicates with function storage 416 via wrap or internal APIs.

JavaScript API interpreter 420 may include the host's native implementation of the technology. JavaScript API interpreter 420 may communicate with JavaScript functions 424 via, for example, arbitrary host-native APIs. JavaScript functions 424 may include the host's native implementation technology.

In this FIGURE, hosted web content 402 represents the implementation of a web-based stack. The content can be stored locally or remotely. In some examples, it may be hosted in an iFrame, as illustrated in the present FIGURE, or via a native web control supported by the host application. This could be, for example, Chromium or Edge control in XAML, as illustrated in FIG. 5.

Portable API wrapper 408 directly interfaces with portable web implementation 404. While the API surface remains consistent, the internal API implementation may change depending on which host the wrapper bridges to.

FIG. 5 is a block diagram of a host UWP application 500, which may be an example of client application 112 of FIG. 1. Host UWP application 500 may employ XAML, Windows Runtime (Win RT), C#, or any combination thereof.

Specifically, host UWP application 500 includes hosted web content 502 and a C# API interpreter 520. C# API interpreter 520 may include Win RT components injected by the application C# code to XAML WebView, callable via a script. C# API interpreter 520 communicates with C# native functions 524 via C# API calls. Hosted web content 502 includes a portable web implementation 504, which may include, for example, HTML, CSS, JavaScript, or other common web technologies. Hosted web content 502 also includes a portable API wrapper 508. Portable API wrapper 508 may include a host-specific API implementation 512, and may communicate with portable web implementation 504 via well-defined common APIs.

Portable API wrapper 508 may also communicate with C# API interpreter 520 via API calls issued to C# API interpreter 520. C# API interpreter 520 responds by issuing JavaScript events to portable API wrapper 508. Portable API wrapper 508 may communicate with C# API interpreter 520 via host-specific native messaging.

Returning to hosted web content 502, portable API wrapper 308 includes host-specific implementation 512 which communicates with function storage 516 via wrap or internal APIs.

C# API interpreter 520 may include the host's native implementation of the technology. C# API interpreter 520 may communicate with C# native functions 524 via, for example, arbitrary host-native APIs. C# native functions 324 may include the host's native implementation technology.

In this FIGURE, hosted web content 502 represents the implementation of a web-based stack. The content can be stored locally or remotely. In some examples, it may be hosted in an iFrame, as illustrated in FIG. 4, or via a native web control supported by the host application. This could be, for example, Chromium or Edge control in XAML, as illustrated in FIG. 5.

Portable API wrapper 508 directly interfaces with portable web implementation 504. While the API surface remains consistent, the internal API implementation may change depending on which host the wrapper bridges to.

One aspect that is consistent between the embodiments illustrated in FIGS. 3, 4, and 5 is the function storage such as function storage 316, function storage 416, and function storage 516. The function storage may be written in JavaScript, and is responsible for storing and keeping track of functions. It can do this by generating a unique ID value and optionally an event name. The ID value is what is passed across the corresponding host-specific API interpreter, such as host-specific API interpreter 320.

The host-specific API interpreter allows the triggering of functions in one context from another language or domain. Because the system deals only with ID values, there is no need to be concerned about function marshalling or the limitations of the structured clone algorithm used by postMessage( ), which can prevent functions from being passed.

Furthermore, the function storage is responsible for reference counting subscriptions to event names. This helps to enable optimizations that can limit the number of calls across the web-to-native host context. This can dramatically increase the performance of subscription registration over postMessage( ). An example using an iFrame host with Microsoft Edge has experimentally shown a subscribe going from 1.7 milliseconds (ms) down to 0.1 ms when the overhead of the postMessage( ) is eliminated. Furthermore, the function storage may keep track of whether there is a remote ID value associated with a given subscription. This may occur in situations such as web-to-web with an iFrame, where both sides are using function storage components. Without this tracking, it may not be possible to gracefully clean up subscriptions when events or handlers are unsubscribed.

The API interpreter (e.g., host-specific API interpreter 320, JavaScript API interpreter 420, or C# API interpreter 520) may reside in the process hosting the content. This means that the host may be a website with an iFrame or a native WebView. In the case of a website host, the API interpreter may handle postMessage( ) events to and from the iFrame, as illustrated in FIG. 4. In other cases, it may be a component that can be loaded into the JavaScript context to expose functionality. For example, in a UWP application, the API interpreter may be a WinRT component. In the existing consumer window system security (WSS) Chromium container, the API interpreter can directly call the native methods of the container itself.

Note that while the API wrapper and API interpreter have different implementations, the channel between them may be secured using standard practices. The primary form of security may include whitelisting of trusted domains, such as domains provided by a security services provider such as security services provider 190 of FIG. 1, using regular expressions.

The native functions may represent the implementation of the API surface accessible from the web context.

In consumer WSS, there are many products built on top of a message bus that expose a standard set of actions. These actions can include publish, request, subscribe, and unsubscribe, by way of nonlimiting example. An API surface of the present specification may provide a similar pattern for interoperability. However, the message format is flexible enough to support different APIs (or actions) and data requirements. For example, a general API message structure may include:

```
{
    "type" : type,
    "params" : data,
    "version" : 1
}
```

As illustrated above, the structure is a set of key value pairs that represent the API call type, the data for the call, and the version of the API. The data themselves may be a set of key value pairs, for example:

```
{
    'eventName' : eventName,
    'callback' : callbackID,
    'success' : successCallbackID,
    'error' : errorCallbackID
}
```

Referring back to FIG. 2 in this context, it is seen that the event name is a string representing the event to respond to. The callback ID, success callback ID, and error callback ID may all be ID values generated by storing functions in function storage 212. When web content 204 calls an API exposed by API wrapper 208, API wrapper 208 uses function storage 212 to store all callbacks passed in. Once the ID values are returned, API wrapper 208 makes a call into API interpreter 216, which in turn calls into the exposed functionality. Once API interpreter 216 receives the result from the host application's native functions 220, an event may be raised, which API wrapper 208 may be listening for. For the iFrame scenario illustrated in FIG. 4 this is a postMessage( ) event, and for the UWP of FIG. 5, it may be a custom event based on system.event. However, it should be noted that this concept applies to other languages, and that the embodiments illustrating JavaScript and C# use cases are provided by way of nonlimiting example only.

Table 2 below provides a high-level overview of the data raised by API interpreter 216.

TABLE 2

| Event Content | |
| --- | --- |
| Properties | Definition |
| MessageType | Corresponds to the message bus actions of Publish, Request, Subscribe, and Unsubscribe. |
| MessageEvent | Optional. This will trigger all callbacks associated with the specified event. |
| MessageArgs | The data to pass into the callback function(s). Typically, a JavaScript object notation (JSON) string. |
| MessageCallbackId | Optional. This will trigger the callback associated with a given id. |

When API wrapper 208 receives an event, it may check which one of message event or message callback ID is provided. Thereafter, API wrapper 208 calls into function storage 212 to trigger the appropriate callback or callbacks. The triggered callbacks are run in the original context of web content 204.

While the example above describes a generic case, it should be noted that this concept can also be chained together. For example, content may be loaded in an iFrame which is hosted in a website which is, itself, hosted in a native WebView.

Leveraging the primitives described above, a web content developer is able to use anonymous functions in their API as part of the API wrapper. This is advantageous over previous solutions that did not allow the use of anonymous functions. In JavaScript, anonymous functions are a widely-used pattern and an expected primitive. For example, they may be used as callbacks. Anonymous functions allow functions to be defined inline, and do not pollute the global scope. In the teachings of the present specification, the web content developer does not need to be aware of how anonymous functions are handled.

In the case of anonymous functions, web content 204 issues a scripted API call to API wrapper 208, with the anonymous function as an input (for example, it may be a callback function). API wrapper 208 may then store the anonymous function in function storage 212. Function storage 212 can then return the assigned function ID. When API wrapper 208 issues the action-plus-function ID, it may provide a call via the web content-to-host-specific bridge. The host may be given access to call anonymous functions via ID. For example, the host can invoke the callback to JavaScript. The flow illustrated in FIG. 2 can otherwise be unmodified.

Figure 6:
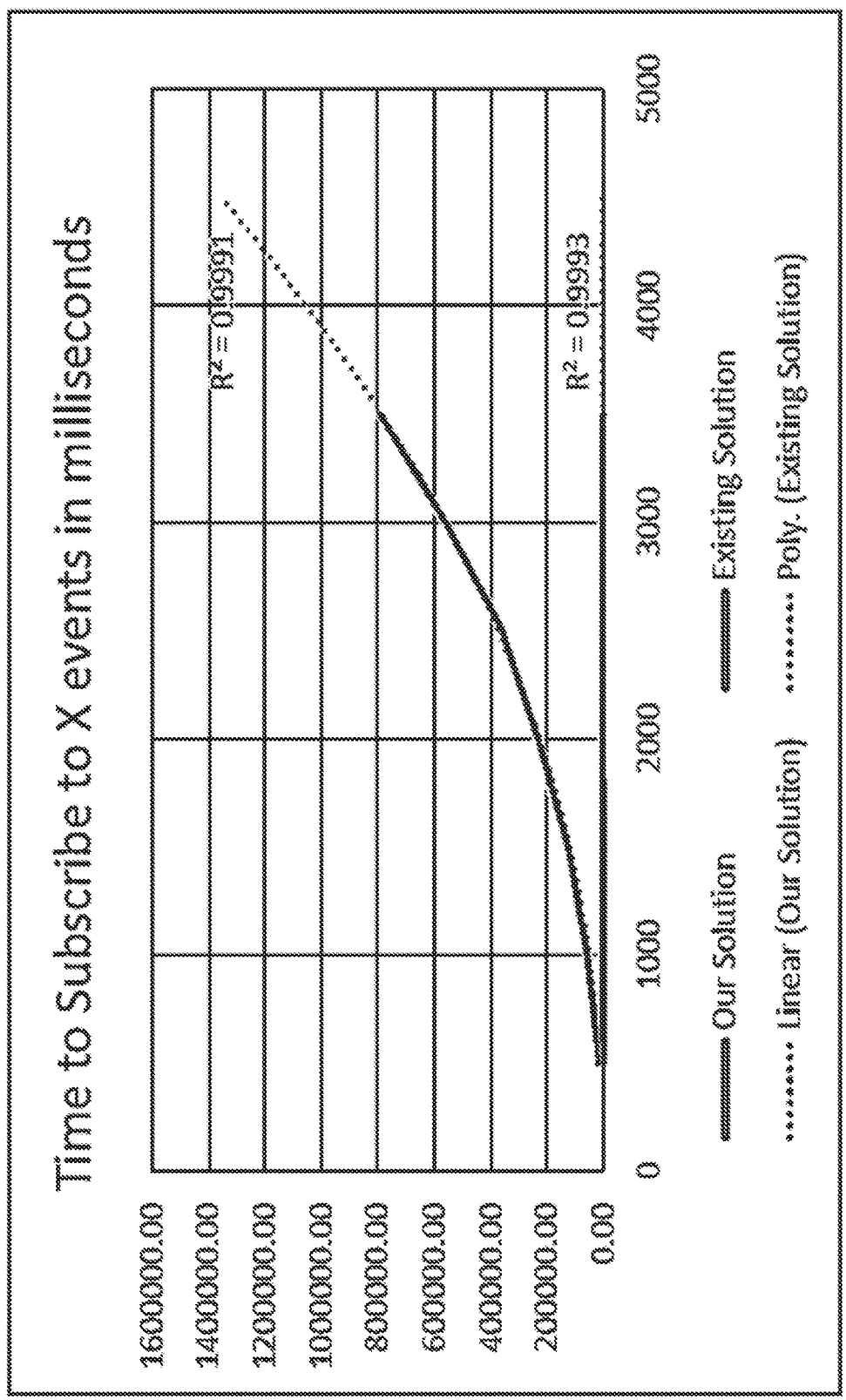
FIG. 6 is a graph illustrating the time to subscribe to an event in milliseconds.

FIG. 6 is a graph illustrating the time to subscribe to an event in milliseconds. In existing solutions, users may use different web content implementations across different host implementations. The teachings of the present specification allow new hosts like UWP applications for Windows 10 S, with a completely different native implementation, to reuse the same content as existing hosts such as Chromium-based UIs in a Windows desktop application. This means that the experience provided to users can be maintained, thus improving the speed of entering new marketplaces and providing new applications even when the native application changes.

Regarding benefits of the system itself, some advantages compared to existing solutions are consistency, performance, and scalability. Consistency is provided because web-based content can leverage the same APIs, while being viewed in different contexts without needing any specific knowledge about where it is being hosted.

In some existing solutions, such as a solution used for web-hosted, in-product transactions in WSS Chromium UI, a number of messages can be handled across the iFrame boundary. This solution does not employ the function storage of the present specification.

The graph of FIG. 6 represents subscriptions, and it should be noted that subscriptions represent a worst-case scenario for each solution. Each new subscription implies a new callback that is registered. The new callback will be executed every time a message is received. Because of this, the performance of each subsequent message, regardless of type, is impacted by the number of active subscriptions. For example, in one experiment, events were subscribed to across the iFrame boundary. It was found that the complexity of the existing solution was approximately $O(n^2)$. In contrast, in the same scenario, the teachings of the present specification were used. The resulting performance was approximately $O(n)$. The new solution is also demonstrated in a worst-case scenario because each subscription is unique. This means that each subscription must cross the iFrame boundary. These results show that it is possible to build more complex scenarios that are more efficient than would be realized using existing technologies.

Note that the graph of FIG. 6 shows a worst-case scenario for the present specification, where optimizations to reduce cross-boundary calls are not necessarily taken advantage of. The trend lines emphasize the polynomial versus linear nature of the complexity discussed above.

The test of this experiment was provided in Microsoft Edge (42.17134.1.0). This was used to prove the concept for use in the UWP dashboard application for an antivirus program. Because the dashboard is a website hosted in a UWP application, it uses Edge as the rendering engine.

While not necessary, some embodiments of the present specification could be adapted to be an industry standard. An entity wishing to have a consistent API set for use by its web content could benefit from the teachings of the present specification. This could include a website hosted in an iFrame talking to the host, an application hosting content made using web technologies (locally or remotely), or a combination of those.

Figure 7:
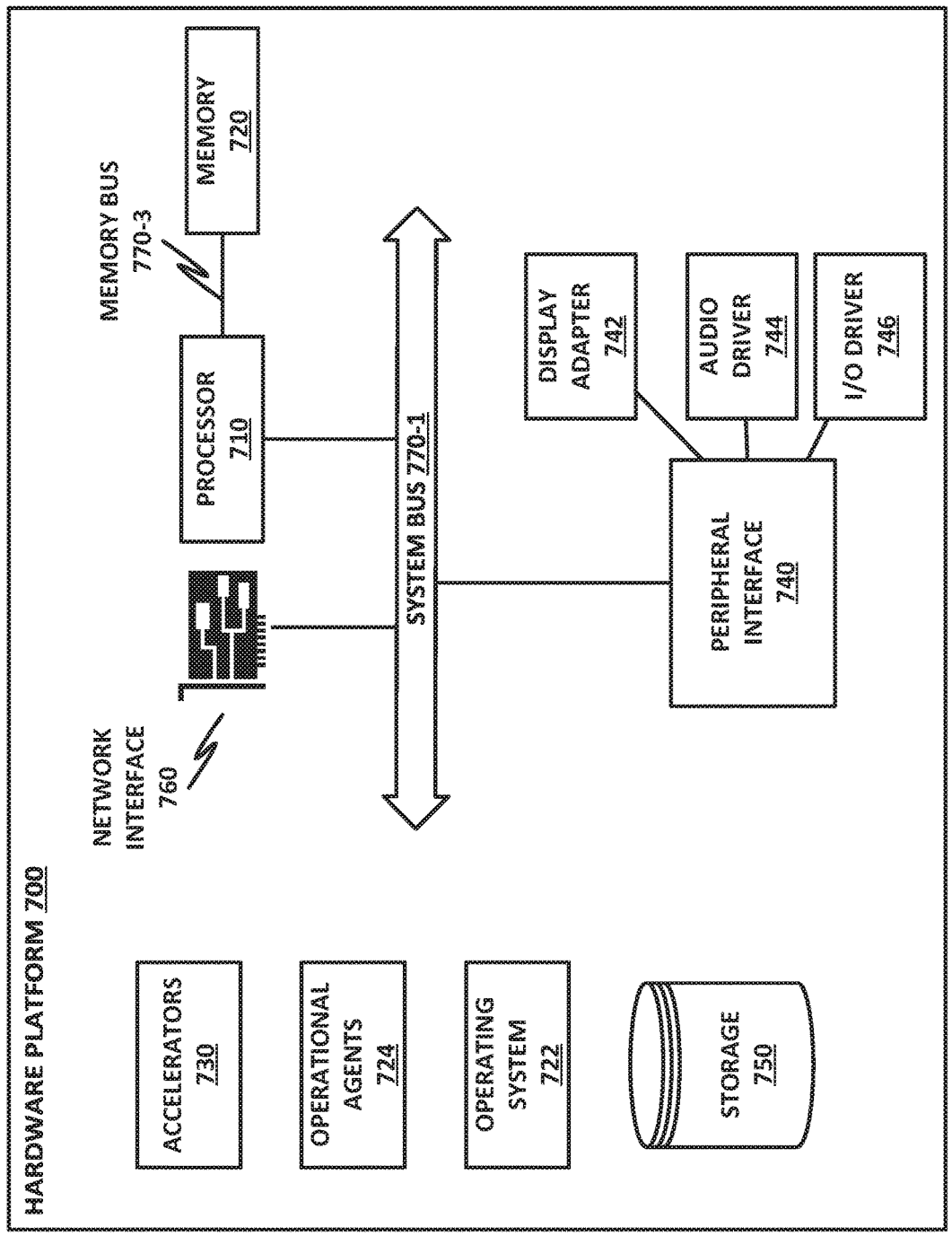
FIG. 7 is a block diagram of a hardware platform.

FIG. 7 is a block diagram of hardware platform 700. Embodiments of hardware platform 700 may be adapted to provide portable hosted content, consistent with the teachings of the present specification.

Hardware platform 700 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it, including any device hosted on the same hardware but that is logically separated (e.g., a different virtual machine, container, or guest) may be designated as a "remote host."

In certain embodiments, client devices QA10, home gateway QA08, and the IoT devices illustrated in FIGURE QA may all be examples of devices that run on a hardware platform such as hardware platform 700. FIG. 7 presents a view of many possible elements that may be included in a hardware platform, but it should be understood that not all of these are necessary in every platform, and platforms may also include other elements. For example, peripheral interface 740 may be an essential component in a user-class device to provide input and output, while it may be completely unnecessary in a virtualized server or hardware appliance that communicates strictly via networking protocols.

By way of illustrative example, hardware platform 700 provides a processor 710 connected to a memory 720 and other system resources via one or more buses, such a system bus 770-1 and a memory bus 770-3.

Other components of hardware platform 700 include a storage 750, network interface 760, and peripheral interface 740. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 720 and storage 750, for example, in a single physical memory device, and in other cases, memory 720 and/or storage 750 are functionally distributed across many physical devices.

In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 760 may provide only the minimum hardware interfaces necessary to perform its logical operation, and may rely on a software driver to provide additional necessary logic. Thus, each logical block disclosed herein is broadly intended to include one or more logic elements designed or configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 710 may be treated as only one core of a multi-core processor, or may be treated as the entire multi-core processor, as appropriate. In some embodiments, one or more co-processors may also be provided for specialized or support functions.

Processor 710 may be communicatively coupled to devices via a system bus 770-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 770-1 is not so limited, and may include any other type of bus.

Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 710 is communicatively coupled to memory 720 via memory bus 770-3, which may be, for example, a direct memory access (DMA) bus, though other memory architectures are possible, including ones in which memory 720 communicates with processor 710 via system bus 770-1 or some other bus. In the same or an alternate embodiment, memory bus 770-3 may include remote direct memory access (RDMA), wherein processor 710 accesses disaggregated memory resources via DMA or DMA-like interfaces.

To simplify this disclosure, memory 720 is disclosed as a single logical block, but in a physical embodiment may include one or more blocks of any suitable volatile or nonvolatile memory technology or technologies, including, for example, double data rate random-access memory (DDR RAM), static random-access memory (SRAM), dynamic random-access memory (DRAM), persistent random-access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 720 may comprise a relatively low-latency volatile main memory, while storage 750 may comprise a relatively higher-latency nonvolatile memory. However, memory 720 and storage 750 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 750 may be any species of memory 720, or may be a separate device. Storage 750 may include one or more non-transitory computer-readable mediums, including, by way of nonlimiting example, a hard drive, solid-state drive, external storage, microcode, hardware instructions, redundant array of independent disks (RAID), network attached storage, optical storage, tape drive, backup system, cloud storage, or any combination of the foregoing. Storage 750 may be, or may include therein, a database or databases or data stored in other configurations, and may include a stored copy of operational software such as operating system 722 and software portions, if any, of operational agents 724, accelerators 730, or other engines. Many other configurations are also possible, and are intended to be encompassed within the broad scope of this specification.

As necessary, hardware platform 700 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 700 may be configured for virtualization or containerization, in which case it may also provide a hypervisor, virtualization platform, virtual machine manager (VMM), orchestrator, containerization platform, or other infrastructure to provide flexibility in allocating resources.

Network interface 760 may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 724 are one or more computing engines that may include one or more non-transitory computer-readable mediums having stored thereon executable instructions operable to instruct a processor to provide operational functions. At an appropriate time, such as upon booting hardware platform 700 or upon a command from operating system 722 or a user or security administrator, processor 710 may retrieve a copy of operational agents 724 (or software portions thereof) from storage 750 and load it into memory 720. Processor 710 may then iteratively execute the instructions of operational agents 724 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, a field-programmable gate array (FPGA) programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic input/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 740 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 742, audio driver 744, and input/output (I/O) driver 746. Display adapter 742 may be configured to provide a human-readable visual output, such as a command-line interface (CLI) or graphical desktop such as Microsoft Windows, Apple OSX desktop, or a Unix/Linux X Window System-based desktop. Display adapter 742 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 742 may include a hardware graphics card, which may have its own memory and its own graphics processing unit (GPU). Audio driver 744 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 8:
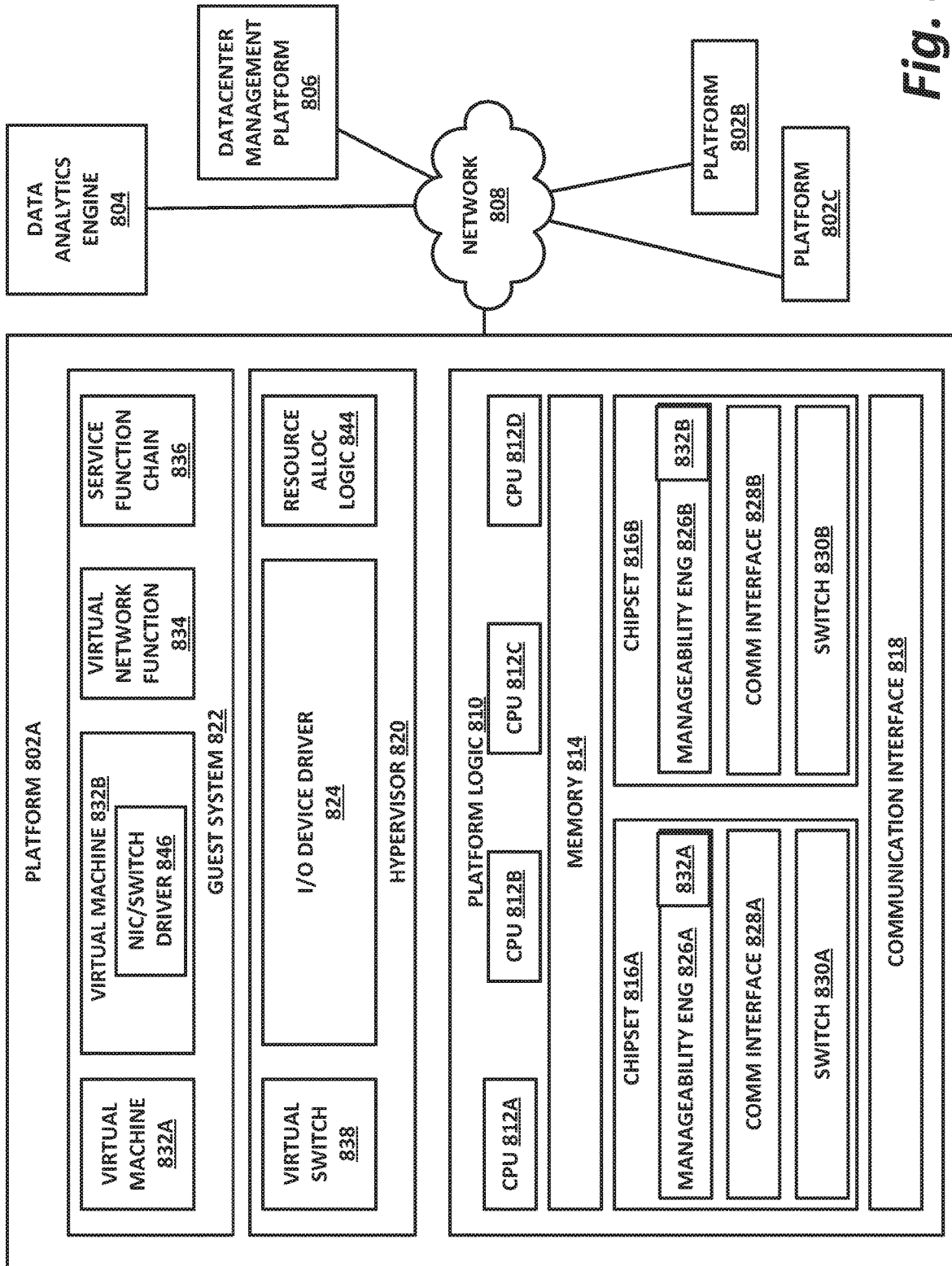
FIG. 8 is a block diagram of components of a computing platform.

FIG. 8 is a block diagram of components of a computing platform 802A. Embodiments of computing platform 802A may be adapted to provide portable hosted content, consistent with the teachings of the present specification.

In the embodiment depicted, platforms 802A, 802B, and 802C, along with a data center management platform 806 and data analytics engine 804 are interconnected via network 808. In other embodiments, a computer system may include any suitable number (i.e., one or more) of platforms.

In some embodiments (e.g., when a computer system only includes a single platform), all or a portion of the system management platform 806 may be included on a platform 802. A platform 802 may include platform logic 810 with one or more central processing units (CPUs) 812, memories 814 (which may include any number of different modules), chipsets 816, communication interfaces 818, and any other suitable hardware and/or software to execute a hypervisor 820 or other operating system capable of executing workloads associated with applications running on platform 802. In some embodiments, a platform 802 may function as a host platform for one or more guest systems 822 that invoke these applications. Platform 802A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an IoT environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 806, hypervisor 820, or other operating system) of computer platform 802A may assign hardware resources of platform logic 810 to perform workloads in accordance with the stress information. In some embodiments, self-diagnostic capabilities may be combined with the stress monitoring to more accurately determine the health of the hardware resources. Each platform 802 may include platform logic 810. Platform logic 810 comprises, among other logic enabling the functionality of platform 802, one or more CPUs 812, memory 814, one or more chipsets 816, and communication interfaces 828. Although three platforms are illustrated, computer platform 802A may be interconnected with any suitable number of platforms. In various embodiments, a platform 802 may reside on a circuit board that is installed in a chassis, rack, or other suitable structure that comprises multiple platforms coupled together through network 808 (which may comprise, e.g., a rack or backplane switch).

CPUs 812 may each comprise any suitable number of processor cores and supporting logic (e.g., uncores). The cores may be coupled to each other, to memory 814, to at least one chipset 816, and/or to a communication interface 818, through one or more controllers residing on CPU 812 and/or chipset 816. In particular embodiments, a CPU 812 is embodied within a socket that is permanently or removably coupled to platform 802A. Although four CPUs are shown, a platform 802 may include any suitable number of CPUs.

Memory 814 may comprise any form of volatile or nonvolatile memory including, without limitation, magnetic media (e.g., one or more tape drives), optical media, RAM, ROM, flash memory, removable media, or any other suitable local or remote memory component or components. Memory 814 may be used for short, medium, and/or long term storage by platform 802A. Memory 814 may store any suitable data or information utilized by platform logic 810, including software embedded in a computer-readable medium, and/or encoded logic incorporated in hardware or otherwise stored (e.g., firmware). Memory 814 may store data that is used by cores of CPUs 812. In some embodiments, memory 814 may also comprise storage for instructions that may be executed by the cores of CPUs 812 or other processing elements (e.g., logic resident on chipsets 816) to provide functionality associated with the manageability engine 826 or other components of platform logic 810. A platform 802 may also include one or more chipsets 816 comprising any suitable logic to support the operation of the CPUs 812. In various embodiments, chipset 816 may reside on the same die or package as a CPU 812 or on one or more different dies or packages. Each chipset may support any suitable number of CPUs 812. A chipset 816 may also include one or more controllers to couple other components of platform logic 810 (e.g., communication interface 818 or memory 814) to one or more CPUs. In the embodiment depicted, each chipset 816 also includes a manageability engine 826. Manageability engine 826 may include any suitable logic to support the operation of chipset 816. In a particular embodiment, a manageability engine 826 (which may also be referred to as an innovation engine) is capable of collecting real-time telemetry data from the chipset 816, the CPU(s) 812 and/or memory 814 managed by the chipset 816, other components of platform logic 810, and/or various connections between components of platform logic 810. In various embodiments, the telemetry data collected includes the stress information described herein.

In various embodiments, a manageability engine 826 operates as an out-of-band asynchronous compute agent which is capable of interfacing with the various elements of platform logic 810 to collect telemetry data with no or minimal disruption to running processes on CPUs 812. For example, manageability engine 826 may comprise a dedicated processing element (e.g., a processor, controller, or other logic) on chipset 816, which provides the functionality of manageability engine 826 (e.g., by executing software instructions), thus conserving processing cycles of CPUs 812 for operations associated with the workloads performed by the platform logic 810. Moreover, the dedicated logic for the manageability engine 826 may operate asynchronously with respect to the CPUs 812 and may gather at least some of the telemetry data without increasing the load on the CPUs.

A manageability engine 826 may process telemetry data it collects (specific examples of the processing of stress information will be provided herein). In various embodiments, manageability engine 826 reports the data it collects and/or the results of its processing to other elements in the computer system, such as one or more hypervisors 820 or other operating systems and/or system management software (which may run on any suitable logic such as system management platform 806). In particular embodiments, a critical event such as a core that has accumulated an excessive amount of stress may be reported prior to the normal interval for reporting telemetry data (e.g., a notification may be sent immediately upon detection).

Additionally, manageability engine 826 may include programmable code configurable to set which CPU(s) 812 a particular chipset 816 will manage and/or which telemetry data will be collected.

Chipsets 816 also each include a communication interface 828. Communication interface 828 may be used for the communication of signaling and/or data between chipset 816 and one or more I/O devices, one or more networks 808, and/or one or more devices coupled to network 808 (e.g., system management platform 806). For example, communication interface 828 may be used to send and receive network traffic such as data packets. In a particular embodiment, a communication interface 828 comprises one or more physical network interface controllers (NICs), also known as network interface cards or network adapters.

A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 816 (e.g., manageability engine 826 or switch 830) and another device coupled to network 808. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 828 may allow communication of data (e.g., between the manageability engine 826 and the data center management platform 806) associated with management and monitoring functions performed by manageability engine 826. In various embodiments, manageability engine 826 may utilize elements (e.g., one or more NICs) of communication interfaces 828 to report the telemetry data (e.g., to system management platform 806) in order to reserve usage of NICs of communication interface 818 for operations associated with workloads performed by platform logic 810.

Switches 830 may couple to various ports (e.g., provided by NICs) of communication interface 828 and may switch data between these ports and various components of chipset 816 (e.g., one or more Peripheral Component Interconnect Express (PCIe) lanes coupled to CPUs 812). Switches 830 may be a physical or virtual (i.e., software) switch.

Platform logic 810 may include an additional communication interface 818. Similar to communication interfaces 828, communication interfaces 818 may be used for the communication of signaling and/or data between platform logic 810 and one or more networks 808 and one or more devices coupled to the network 808. For example, communication interface 818 may be used to send and receive network traffic such as data packets. In a particular embodiment, communication interfaces 818 comprise one or more physical NICs. These NICs may enable communication between any suitable element of platform logic 810 (e.g., CPUs 812 or memory 814) and another device coupled to network 808 (e.g., elements of other platforms or remote computing devices coupled to network 808 through one or more networks).

Platform logic 810 may receive and perform any suitable types of workloads. A workload may include any request to utilize one or more resources of platform logic 810, such as one or more cores or associated logic. For example, a workload may comprise a request to instantiate a software component, such as an I/O device driver 824 or guest system 822; a request to process a network packet received from a virtual machine 832 or device external to platform 802A (such as a network node coupled to network 808); a request to execute a process or thread associated with a guest system 822, an application running on platform 802A, a hypervisor 820 or other operating system running on platform 802A; or other suitable processing request.

A virtual machine 832 may emulate a computer system with its own dedicated hardware. A virtual machine 832 may run a guest operating system on top of the hypervisor 820. The components of platform logic 810 (e.g., CPUs 812, memory 814, chipset 816, and communication interface 818) may be virtualized such that it appears to the guest operating system that the virtual machine 832 has its own dedicated components.

A virtual machine 832 may include a virtualized NIC (vNIC), which is used by the virtual machine as its network interface. A vNIC may be assigned a media access control (MAC) address or other identifier, thus allowing multiple virtual machines 832 to be individually addressable in a network.

VNF 834 may comprise a software implementation of a functional building block with defined interfaces and behavior that can be deployed in a virtualized infrastructure. In particular embodiments, a VNF 834 may include one or more virtual machines 832 that collectively provide specific functionalities (e.g., WAN optimization, VPN termination, firewall operations, load-balancing operations, security functions, etc.). A VNF 834 running on platform logic 810 may provide the same functionality as traditional network components implemented through dedicated hardware. For example, a VNF 834 may include components to perform any suitable network function virtualization (NFV) workloads, such as virtualized evolved packet core (vEPC) components, mobility management entities (MMEs), 3rd Generation Partnership Project (3GPP) control and data plane components, etc.

SFC 836 is a group of VNFs 834 organized as a chain to perform a series of operations, such as network packet processing operations. Service function chaining may provide the ability to define an ordered list of network services (e.g., firewalls and load balancers) that are stitched together in the network to create a service chain.

A hypervisor 820 (also known as a virtual machine monitor) may comprise logic to create and run guest systems 822. The hypervisor 820 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 810. Services of hypervisor 820 may be provided by virtualizing in software or through hardware assisted resources that require minimal software intervention, or both. Multiple instances of a variety of guest operating systems may be managed by the hypervisor 820. Each platform 802 may have a separate instantiation of a hypervisor 820.

Hypervisor 820 may be a native or bare-metal hypervisor that runs directly on platform logic 810 to control the platform logic and manage the guest operating systems. Alternatively, hypervisor 820 may be a hosted hypervisor that runs on a host operating system and abstracts the guest operating systems from the host operating system. Hypervisor 820 may include a virtual switch 838 that may provide virtual switching and/or routing functions to virtual machines of guest systems 822. The virtual switch 838 may comprise a logical switching fabric that couples the vNICs of the virtual machines 832 to each other, thus creating a virtual network through which virtual machines may communicate with each other.

Virtual switch 838 may comprise a software element that is executed using components of platform logic 810. In various embodiments, hypervisor 820 may be in communication with any suitable entity (e.g., a software-defined network controller) which may cause hypervisor 820 to reconfigure the parameters of virtual switch 838 in response to changing conditions in platform 802 (e.g., the addition or deletion of virtual machines 832 or identification of optimizations that may be made to enhance performance of the platform).

Hypervisor 820 may also include resource allocation logic 844, which may include logic for determining allocation of platform resources based on the telemetry data (which may include stress information). Resource allocation logic 844 may also include logic for communicating with various components of platform logic 810 entities of platform 802A to implement such optimization, such as components of platform logic 810.

Any suitable logic may make one or more of these optimization decisions. For example, system management platform 806; resource allocation logic 844 of hypervisor 820 or other operating system; or other logic of computer platform 802A may be capable of making such decisions. In various embodiments, the system management platform 806 may receive telemetry data from and manage workload placement across multiple platforms 802. The system management platform 806 may communicate with hypervisors 820 (e.g., in an out-of-band manner) or other operating systems of the various platforms 802 to implement workload placements directed by the system management platform.

The elements of platform logic 810 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 802A may be coupled together in any suitable manner such as through one or more networks 808. A network 808 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 9:
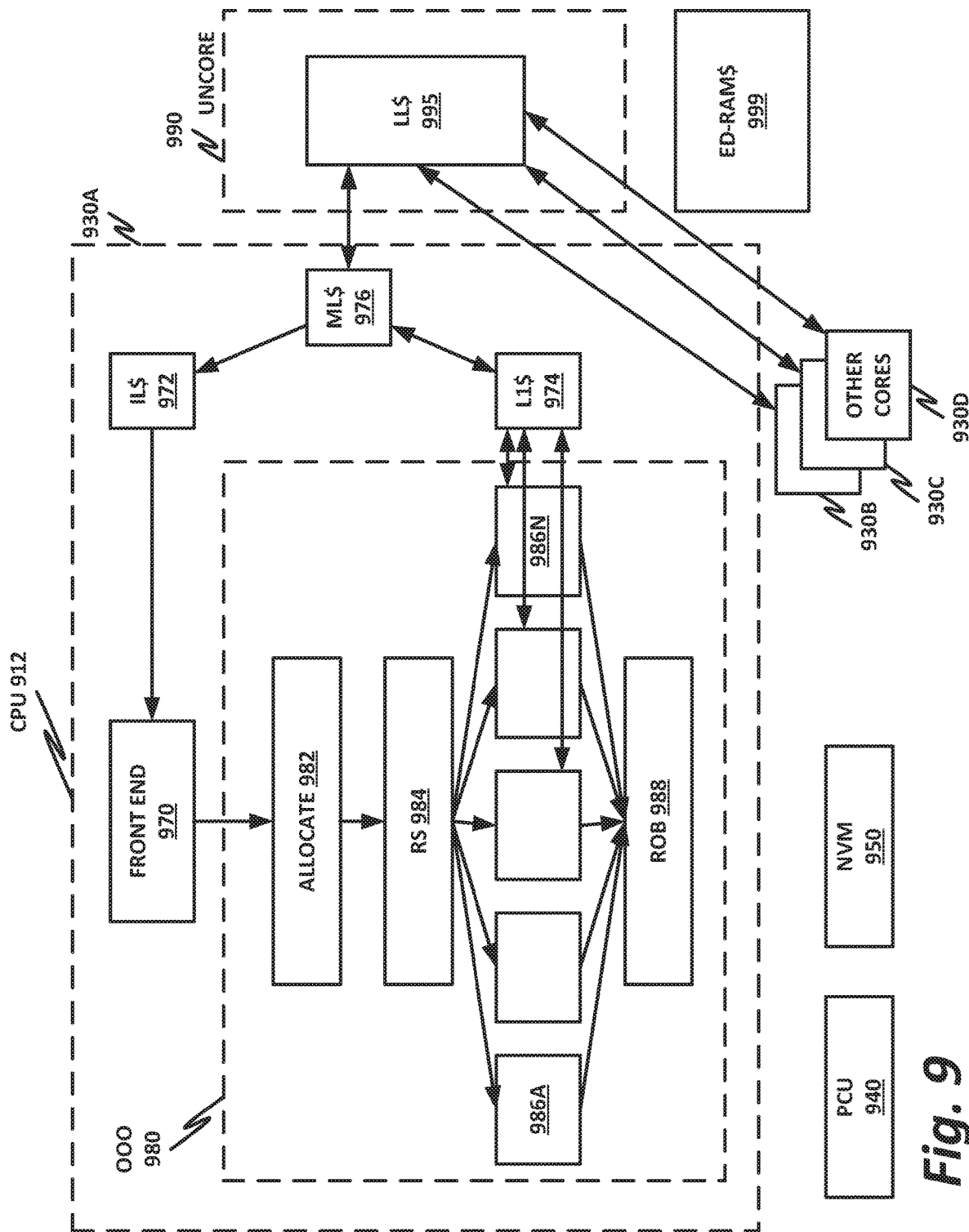
FIG. 9 is a block diagram of a central processing unit (CPU).

FIG. 9 is a block diagram of a CPU 912. Embodiments of CPU 912 may be adapted to provide portable hosted content, consistent with the teachings of the present specification.

Although CPU 912 depicts a particular configuration, the cores and other components of CPU 912 may be arranged in any suitable manner. CPU 912 may comprise any processor or processing device, such as a microprocessor, an embedded processor, a digital signal processor (DSP), a network processor, an application processor, a co-processor, a system-on-a-chip (SoC), or other device to execute code. CPU 912, in the depicted embodiment, includes four processing elements (cores 930 in the depicted embodiment), which may include asymmetric processing elements or symmetric processing elements. However, CPU 912 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 930A includes an out-of-order processor that has a front end unit 970 used to fetch incoming instructions, perform various processing (e.g., caching, decoding, branch predicting, etc.) and passing instructions/operations along to an out-of-order (OOO) engine. The OOO engine performs further processing on decoded instructions.

A front end 970 may include a decode module coupled to fetch logic to decode fetched elements. Fetch logic, in one embodiment, includes individual sequencers associated with thread slots of cores 930. Usually, a core 930 is associated with a first ISA, which defines/specifies instructions executable on core 930. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 930, in one embodiment, recognize the same ISA (or a subset thereof). Alternatively, in a heterogeneous core environment, a decoder of one or more cores (e.g., core 930B) may recognize a second ISA (either a subset of the first ISA or a distinct ISA).

In the embodiment depicted, the OOO engine includes an allocate unit 982 to receive decoded instructions, which may be in the form of one or more micro-instructions or uops, from front end unit 970, and allocate them to appropriate resources such as registers and so forth. Next, the instructions are provided to a reservation station 984, which reserves resources and schedules them for execution on one of a plurality of execution units 986A-986N. Various types of execution units may be present, including, for example, arithmetic logic units (ALUs), load and store units, vector processing units (VPUs), and floating point execution units, among others. Results from these different execution units are provided to a reorder buffer (ROB) 988, which take unordered results and return them to correct program order.

In the embodiment depicted, both front end unit 970 and OOO engine 980 are coupled to different levels of a memory hierarchy. Specifically shown is an instruction level cache 972, that in turn couples to a mid-level cache 976, that in turn couples to a last level cache 995. In one embodiment, last level cache 995 is implemented in an on-chip (sometimes referred to as uncore) unit 990. Uncore 990 may communicate with system memory 999, which, in the illustrated embodiment, is implemented via enhanced DRAM (eDRAM). The various execution units 986 within OOO engine 980 are in communication with a first level cache 974 that also is in communication with mid-level cache 976. Additional cores 930B-930D may couple to last level cache 995 as well.

In particular embodiments, uncore 990 may be in a voltage domain and/or a frequency domain that is separate from voltage domains and/or frequency domains of the cores. That is, uncore 990 may be powered by a supply voltage that is different from the supply voltages used to power the cores and/or may operate at a frequency that is different from the operating frequencies of the cores.

CPU 912 may also include a power control unit (PCU) 940. In various embodiments, PCU 940 may control the supply voltages and the operating frequencies applied to each of the cores (on a per-core basis) and to the uncore. PCU 940 may also instruct a core or uncore to enter an idle state (where no voltage and clock are supplied) when not performing a workload.

In various embodiments, PCU 940 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 940 may detect stress characteristics at any suitable interval.

In various embodiments, PCU 940 is a component that is discrete from the cores 930. In particular embodiments, PCU 940 runs at a clock frequency that is different from the clock frequencies used by cores 930. In some embodiments where the PCU is a microcontroller, PCU 940 executes instructions according to an ISA that is different from an ISA used by cores 930.

In various embodiments, CPU 912 may also include a nonvolatile memory 950 to store stress information (such as stress characteristics, incremental stress values, accumulated stress values, stress accumulation rates, or other stress information) associated with cores 930 or uncore 990, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including CPU package. An SoC represents an integrated circuit (IC) that integrates components of a computer or other electronic system into a single chip. Thus, for example, client devices 110 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 610, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 650 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs.

Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 620 and storage 650, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 610 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or ICs, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed, in one example, a computing apparatus for providing a portable user interface agnostic to a native host implementation, comprising: a hardware platform comprising a processor and a memory; a first functional domain comprising logic to provide the user interface; a second functional domain comprising logic to provide native functionality; a function storage comprising logic to assign a unique identifier to a function of the second functional domain; and an application programming interface (API) interpreter to enable the first functional domain to access the function of the second functional domain via the unique identifier for the function.

There is further disclosed a computing apparatus, wherein the function storage further comprises logic to provide subscriptions to events that may be raised by the second functional domain for use in the first functional domain.

There is further disclosed a computing apparatus, wherein the function storage further comprises logic to provide a reference count of subscriptions to named events.

There is further disclosed a computing apparatus, wherein the function storage further comprises logic to track remote identifiers associated with subscriptions.

There is further disclosed a computing apparatus, wherein the function storage further comprises an event name for an event in the first functional domain that may be raised by the function of the second functional domain.

There is further disclosed a computing apparatus, wherein the function storage further comprises a callback identifier for the function of the second functional domain.

There is further disclosed a computing apparatus, wherein the API interpreter resides within the first functional domain.

There is further disclosed a computing apparatus, wherein the user interface is a web interface comprising HTML, JavaScript, and/or CSS encodings.

There is further disclosed a computing apparatus, wherein the second functional domain comprises native security functions.

There is further disclosed a computing apparatus, wherein the API interpreter is configured to provide an API surface that is backward-compatible with a legacy messaging format.

There are also disclosed one or more tangible, non-transitory computer-readable storage mediums having stored thereon executable instructions to instruct a hardware platform to: provide a user interface within a first functional domain; provide platform-native functionality within a second functional domain; allocate a function storage configured to assign an identifier to a native function of the second functional domain; and provide an application programming interface (API) interpreter, the API interpreter comprising an API surface that enables the user interface to call the native function by its identifier.

There are further disclosed one or more tangible, non-transitory computer-readable storage mediums, wherein the function storage is further configured to provide an interface for the user interface to subscribe to events, wherein the events can be raised within the second functional domain.

There are further disclosed one or more tangible, non-transitory computer-readable storage mediums, wherein the function storage further is further configured to provide a reference count of subscriptions to named events.

There are further disclosed one or more tangible, non-transitory computer-readable storage mediums, wherein the function storage is further configured to track remote identifiers associated with subscriptions.

There are further disclosed one or more tangible, non-transitory computer-readable storage mediums, wherein the function storage is further configured to store an event name for an event in the first functional domain that may be raised by the function of the second functional domain.

There are further disclosed one or more tangible, non-transitory computer-readable storage mediums, wherein the function storage is further configured to store a callback identifier for the function of the second functional domain.

There are further disclosed one or more tangible, non-transitory computer-readable storage mediums, wherein the API interpreter resides within the first functional domain.

There are further disclosed one or more tangible, non-transitory computer-readable storage mediums, wherein the user interface is a web interface comprising HTML, JavaScript, and/or CSS encodings.

There are further disclosed one or more tangible, non-transitory computer-readable storage mediums, wherein the second functional domain comprises native security functions.

There are further disclosed one or more tangible, non-transitory computer-readable storage mediums, wherein the API surface is backward-compatible with a legacy messaging format.

There is also disclosed a method of providing a portable user interface for a computing platform having a user interface in a first functional domain and native functionality in a second functional domain, comprising: providing a function storage configured to assign an identifier to a native function of the second functional domain; and providing an application programming interface (API) interpreter, the API interpreter comprising an API surface that enables the user interface of the first functional domain to call the native function by its identifier.

There is further disclosed a method, wherein the function storage is further configured to provide an interface for the user interface to subscribe to events, wherein the events can be raised within the second functional domain.

There is further disclosed a method, wherein the function storage further is further configured to provide a reference count of subscriptions to named events.

There is further disclosed a method, wherein the function storage is further configured to track remote identifiers associated with subscriptions.

There is further disclosed a method, wherein the function storage is further configured to store an event name for an event in the first functional domain that may be raised by the function of the second functional domain.

There is further disclosed a method, wherein the function storage is further configured to store a callback identifier for the function of the second functional domain.

There is further disclosed a method, further comprising providing the API interpreter within the first functional domain.

There is further disclosed a method, wherein the user interface is a web interface comprising HTML, JavaScript, and/or CSS encodings.

There is further disclosed a method, wherein the second functional domain comprises native security functions.

There is further disclosed a method, wherein the API surface is backward-compatible with a legacy messaging format.

What is claimed is:

1. A computing apparatus for providing a portable web technology-based user interface agnostic to a native host implementation, comprising:
    a hardware platform comprising a processor and a memory;
    a first functional domain comprising logic to provide the portable web technology-based user interface;
    a second functional domain comprising logic to provide native functionality;
    a function storage comprising logic to assign a unique identifier and an associated event name to a host-native function of the second functional domain; and
    an application programming interface (API) interpreter to enable the first functional domain to access the host-native function of the second functional domain via the unique identifier for the host-native function.

2. The computing apparatus of claim 1, wherein the function storage further comprises logic to provide subscriptions to events raised by the second functional domain for use in the first functional domain.

3. The computing apparatus of claim 2, wherein the function storage further comprises logic to provide a reference count of subscriptions to named events.

4. The computing apparatus of claim 2, wherein the function storage further comprises logic to track remote identifiers associated with subscriptions.

5. The computing apparatus of claim 1, wherein the function storage further comprises an event name for an event in the first functional domain raised by the host-native function of the second functional domain.

6. The computing apparatus of claim 1, wherein the function storage further comprises a callback identifier for the host-native function of the second functional domain.

7. The computing apparatus of claim 1, wherein the API interpreter resides within the first functional domain.

8. The computing apparatus of claim 1, wherein the portable web technology-based user interface is a web interface comprising Hypertext Markup Language (HTML), JavaScript, and/or Cascading Style Sheets (CSS) encodings.

9. The computing apparatus of claim 1, wherein the second functional domain comprises native security functions.

10. The computing apparatus of claim 1, wherein the API interpreter is configured to provide an API surface that is backward-compatible with a legacy messaging format.

11. One or more tangible, non-transitory computer-readable storage mediums having stored thereon executable instructions to instruct a hardware platform to:
    provide a web technology-based user interface within a first functional domain;
    provide platform-native functionality within a second functional domain;
    allocate a function storage configured to assign an identifier and associated metadata to a native function of the second functional domain; and
    provide an application programming interface (API) interpreter, the API interpreter comprising an API surface that enables the web technology-based user interface to call a platform-native function by its identifier.

12. The one or more tangible, non-transitory computer-readable storage mediums of claim 11, wherein the function storage is further configured to provide an interface for the web technology-based user interface to subscribe to events, wherein the events can be raised within the second functional domain.

13. The one or more tangible, non-transitory computer-readable storage mediums of claim 11, wherein the function storage is further configured to store an event name for an event in the first functional domain raised by the native function of the second functional domain.

14. The one or more tangible, non-transitory computer-readable storage mediums of claim 11, wherein the function storage is further configured to store a callback identifier for the native function of the second functional domain.

15. The one or more tangible, non-transitory computer-readable storage mediums of claim 11, wherein the API interpreter resides within the first functional domain.

16. The one or more tangible, non-transitory computer-readable storage mediums of claim 11, wherein the second functional domain comprises native security functions.

17. A method of providing a portable web technology-based user interface for a computing platform having a user interface in a first functional domain and native functionality in a second functional domain, comprising:
    providing a web-technology based user interface within the first functional domain;
    providing a function storage configured to assign an identifier and associated metadata to a host-native function of the second functional domain; and
    providing an application programming interface (API) interpreter, the API interpreter comprising an API surface that enables web-technology based on the user interface of the first functional domain to call the host-native function by its identifier.

18. The method of claim 17, wherein the function storage is further configured to provide an interface for the user interface to subscribe to events, wherein the events can be raised within the second functional domain.

19. The method of claim 17, further comprising providing the API interpreter within the first functional domain.

20. The method of claim 17, wherein the API surface is backward-compatible with a legacy messaging format.

* * * * *